(12) United States Patent
Ollila (10) Patent No.: US 7,554,243 B2
(45) Date of Patent: Jun. 30, 2009

(54) CLASS DE DRIVING AMPLIFIER FOR PIEZOELECTRIC ACTUATORS

(75) Inventor: Mikko Ollila, Tampere (FI)

(73) Assignee: Nokia Corporation, Espoo (FI)

( * ) Notice: Subject to any disclaimer, the term of this patent is extended or adjusted under 35 U.S.C. 154(b) by 560 days.

(21) Appl. No.: 11/174,451

(22) Filed: Jul. 1, 2005

(65) Prior Publication Data

US 2006/0001332 A1   Jan. 5, 2006

(30) Foreign Application Priority Data

Jul. 2, 2004   (FI)   ................................. 20045263

(51) Int. Cl.
  *H01L 41/09*   (2006.01)
(52) U.S. Cl. ..................................... 310/317
(58) Field of Classification Search ................ 310/317, 310/316, 328, 316.01–316.03, 319
  See application file for complete search history.

(56) References Cited

U.S. PATENT DOCUMENTS

| | | | |
|---|---|---|---|
| 5,616,980 | A | 4/1997 | Zumeris |
| 6,046,527 | A | 4/2000 | Roopnarine et al. |

(Continued)

FOREIGN PATENT DOCUMENTS

| | | | |
|---|---|---|---|
| JP | 07274558 | | 10/1995 |
| JP | 2002165469 | | 6/2002 |
| JP | 2002-165469 | * | 11/2002 |
| JP | 2004254390 | | 9/2004 |
| WO | WO 0250923 | | 6/2002 |
| WO | WO 03104874 | | 12/2003 |

OTHER PUBLICATIONS

"Characteristics of a Piezoelectric Miniature Motor; Sensors and Actuators A;" M. Bexell et al; May 25, 1999; vol. 75, No. 2, pp. 118-130.

(Continued)

*Primary Examiner*—Quyen Leung
*Assistant Examiner*—Karen B Addison
(74) *Attorney, Agent, or Firm*—Alfred A. Fressola; Ware, Fressola, Van Der Sluys & Adolphson, LLP (57) ABSTRACT

The invention relates to a method and device for driving a piezo-electric actuator. A driving voltage is coupled to the piezo-electric actuator by an inductive element coupled in series with the piezo-electric actuator. The piezo-electric actuator is adapted to move an object. The frequency of the driving voltage coupled to the piezo-electric actuator is varied and the velocity of the object is recorded as a function of the frequency. Subsequently, an optimum frequency is determined and the frequency of the driving voltage is adjusted to be substantially equal to the optimum frequency. The optimum frequency is preferably associated with a maximum obtainable velocity of the object.

8 Claims, 7 Drawing Sheets

U.S. PATENT DOCUMENTS

| | | | |
|---|---|---|---|
| 6,373,170 | B1 | 4/2002 | Hills |
| 6,617,754 | B1 * | 9/2003 | Knauss ............... 310/316.02 |
| 6,967,430 | B2 * | 11/2005 | Johansson ................ 310/328 |
| 7,119,477 | B1 * | 10/2006 | Ganor et al. ......... 310/323.13 |
| 2002/0074901 | A1 | 6/2002 | Johansson |
| 2003/0227559 | A1 | 12/2003 | Rouvinen et al. |
| 2004/0195935 | A1 | 10/2004 | Jansson et al. |

OTHER PUBLICATIONS

"Push/Pull Class-DE Switching Power Amplifier;" TH2D-3; Anton Alipov et al; IEEE MTT-S Digest; 2002.

"Class DE High-Efficiency Tuned Power Amplifier;" Hirotaka Koizumi et al; IEEE Transactions on Circuits and Systems—I: Fundamental Theory and Applications; vol. 43, No. 1, Jan. 1996.

"Class-D zero-voltage-switching inverter with only one shunt capacitor;" M.K. Kazimierczuk et al; IEEE Proceedings—B, vol. 13, No. 5, Sep. 1992.

"A 3.3V/1W Class D Audio Power Amplifier with 103dB DR and 90% Efficiency;" Vahid M. Tousi et al; IEEE Proc. 23$^{rd}$ International Conference on Microelectronics (MIEL 2002), vol. 2, Nis, Yugoslavia, May 12-15, 2002.

* cited by examiner

CLASS DE DRIVING AMPLIFIER FOR PIEZOELECTRIC ACTUATORS

CROSS-REFERENCE TO RELATED APPLICATIONS

This application claims priority under 35 USC §119 to Finnish Patent Application No. 20045263 filed on Jul. 2, 2004.

FIELD OF THE INVENTION

The present invention relates to a piezo-element driving device and a method for driving piezo-elements. The present invention relates also to a device comprising a piezo-element driving device.

BACKGROUND OF THE INVENTION

Piezo-electric actuators are used in imaging systems to adjust the positions of zoom and focusing lens systems. Piezo-electric actuators are also used in other systems to move small objects. Driving devices providing suitable driving voltages are required to operate said piezo-electric actuators. Piezo-electric actuators are implemented by using one or more piezo-elements, which are deflected, expanded or contracted when coupled to an activating voltage.

An aspect in mobile devices is that the voltage of an available power supply is typically lower than the optimum driving voltage of the piezo-elements. Further, in mobile systems, the available power supply is typically a battery with a limited capacity. Therefore energy consumption related to the driving of piezo-elements is a problem especially in mobile systems. A piezo-element comprises a substantial internal capacitance, which stores energy when the piezo-element is charged by coupling to a driving voltage. In order to save energy, it is advantageous to re-use the energy stored in the piezo-elements.

It is known as such that a piezo-element may be connected in series with an inductive element to implement a resonance circuit. When such a resonance circuit is driven with a resonance frequency, the capacitive energy stored in the piezo-element is re-used. Further, thanks to the resonance, the voltage over said piezo-element is higher than the driving voltage. A device based on such arrangement is disclosed for example in a Japanese patent application JP06058847.

SUMMARY OF THE INVENTION

It is an object of the present invention to provide a device and a method for driving a piezo-electric actuator in an energy-efficient way, while also providing a maximum velocity to a movable object moved by said actuator. A further object of the present invention is to provide a mobile device comprising such a driving device.

The devices and the method according to the present invention are mainly characterized in that an optimum driving frequency of a piezo-actuator is determined based on the velocity of the object movable by said piezo-actuator, and that the driving frequency of said piezo-actuator is adjusted to be substantially equal to said optimum driving frequency.

According to a first aspect of the invention, there is a method to electrically drive a piezo-element arranged to move a movable object, said method comprising at least the steps of driving said piezo-element to determine one or more velocity values, each of said one or more velocity values being dependent on a velocity of said movable object, determining an optimum driving frequency based on said one or more velocity values, and adjusting the driving frequency of said piezo-element to be substantially equal to said optimum driving frequency.

According to a second aspect of the invention, there is a piezo-element driving device comprising at least a first output to drive a piezo-element, driving means to provide a driving voltage to said first output, an input to receive a position signal, first signal processing means to determine one or more values, each of said one or more values being dependent on a rate of change of said position signal, second signal processing means to determine an optimum driving frequency based on said one or more values, and adjustment means to adjust the driving frequency of said driving voltage to be substantially equal to said optimum driving frequency.

According to a third aspect of the invention, there is a device comprising at least a movable object, a piezo-element to move said movable object, a piezo-element driving device to provide a driving voltage to said piezo-element, and a position sensor to provide a position signal dependent on the position of said movable object, said piezo-element driving device in turn comprising at least first signal processing means to determine one or more velocity values, each of said one or more velocity values being dependent on a velocity of said movable object, second signal processing means to determine an optimum driving frequency based on said one or more velocity values, and adjustment means to adjust the driving frequency of said driving voltage to be substantially equal to said optimum driving frequency.

According to one embodiment of the invention, the optimum driving frequency is associated with a maximum obtainable velocity of said movable object.

According to another embodiment of the invention, a further criterion for selecting the optimum driving frequency Fopt is minimizing the noise generated by the piezo-actuator or -drive.

According to the present invention, optimum performance of the piezo-elements is obtained, irrespective of manufacturing tolerances and temperature drift of operating parameters. Further, the piezo-elements are driven with good efficiency. The improvement is significant when compared with prior art methods in which the design is based on fixed driving frequency, said fixed driving frequency being determined on the basis of average component parameters in typical operating conditions.

The invention allows taking into account unique and/or temperature-dependent parameters of individual piezo-elements.

The embodiments of the invention and their benefits will become more apparent to a person skilled in the art through the description and examples given herein below, and also through the appended claims.

BRIEF DESCRIPTION OF THE DRAWINGS

In the following examples, the embodiments of the invention will be described in mode detail with reference to the appended drawings, in which.

DETAILED DESCRIPTION OF THE INVENTION

Figure 1:
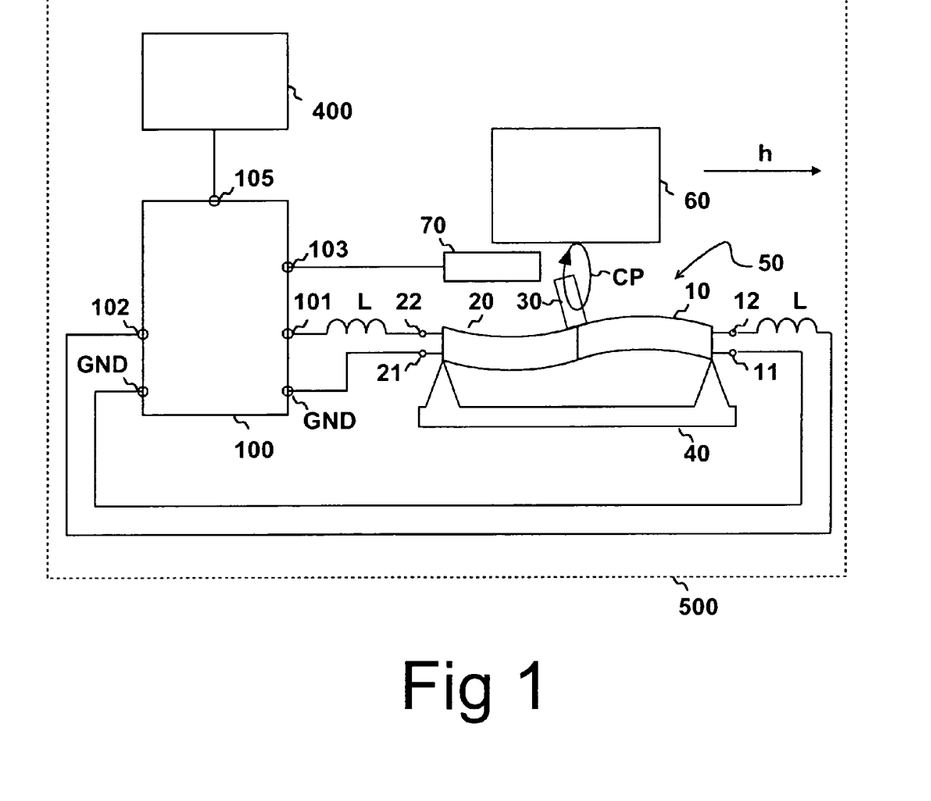
FIG. 1 shows by way of example a device comprising a piezo-electric actuator and a driving device according to the present invention, FIG. 2. shows by way of example the velocity of a movable object as a function of a driving frequency coupled to a piezo-element, said piezo-element arranged to move said object.

Referring to FIG. 1, a device 500 according to the present invention comprises a driving device 100. The outputs 101, 102 of the driving device 100 are coupled to the connecting nodes 12, 22 of a piezo-electric actuator 50 by inductive elements L. The driving device is controlled by a control unit 400, which communicates with the driving device 100 by a data node 105. GND denotes ground voltage.

The piezo-electric actuator 50 may comprise two independently deflectable piezo-elements 10, 20, which are connected together. A protrusion 30 is attached near the connection point of said two piezo-elements 10, 20. The piezo-elements 10, 20 are supported by a support 40, which allows deflection of said piezo-elements 10, 20. The degree of deflection of each piezo-element 10, 20 is changed when a voltage is applied between voltage nodes 11, 12, 21, 22 of said piezo-elements 10, 20. The piezo-actuator is preferably implemented using bimorphs. Such bimorphs are described, for example, in the patent application PCT/US03/17611.

The degree of deflection of said two piezo-elements is changed in a cyclic manner when alternating voltages are coupled to the voltage nodes 11, 12, 21, and 22. The tip of the protrusion 30 moves along a closed path CP when there is a phase difference between the alternating voltages coupled to the two piezo-elements 10, 20.

The protrusion 30 is positioned near a movable object 60. The protrusion 30 contacts the object 60 and moves the object to the direction h. The direction of the motion may be changed by reversing the sign of the phase difference, i.e. from 90 degrees to minus 90 degrees.

The position of the movable object 60 is monitored by a position sensor 70. The position signal is communicated to the driving device 100 by a node 103.

Preferably, the position sensor 70 is non-contacting optical sensor device providing an analog current or voltage signal dependent on the position of the movable object 60. However, the position sensor 70 may also provide a digital signal.

Figure 2:
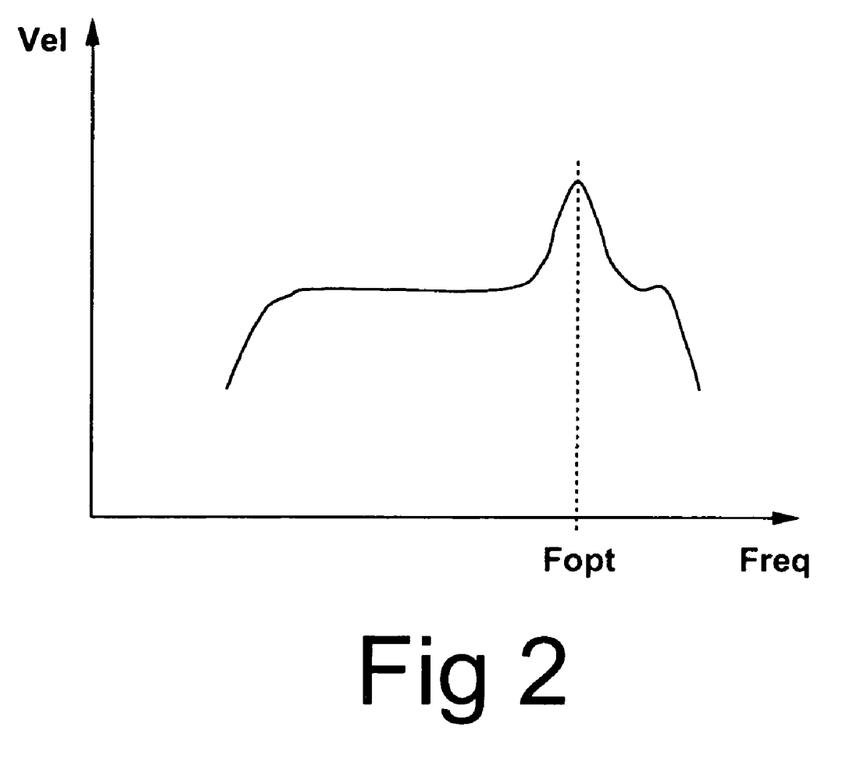

Referring to FIG. 2, the velocity Vel of the movable object 60 exhibits a maximum near an optimum frequency Fopt of the driving voltage coupled to the piezo-electric actuator 50. Freq. denotes the driving frequency in FIG. 2. The optimum frequency Fopt is related to the resonance frequency of a resonance circuit comprising substantially the coupling inductor L and the internal capacitance of the piezo-element 10, 20. The internal capacitance depends on operating temperature, and consequently the optimum frequency is not constant and depends on the temperature. The temperature-dependent optimum frequency may be, for example, in the order of 90 kHz. The value of the internal capacitance may vary, for example in the range of −50 to 150% depending on the operating temperature.

Figure 3:
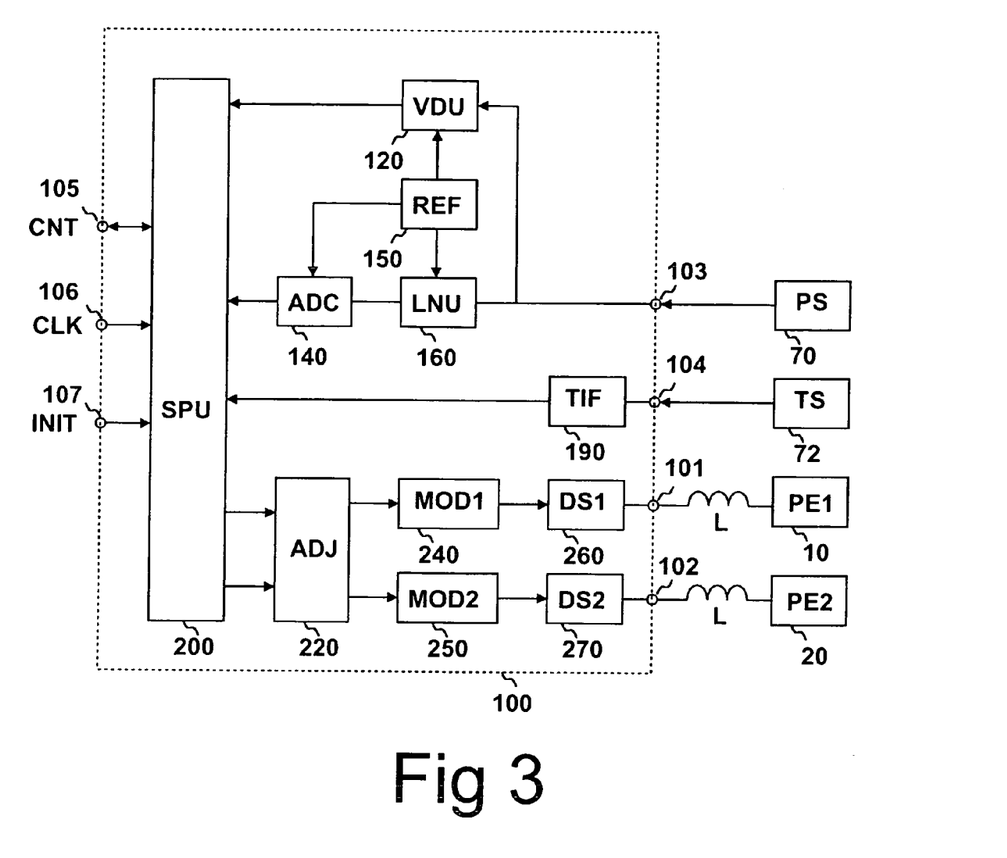
FIG. 3 shows a block diagram of a driving device according to the preferred embodiment of the present invention.

Referring now to FIG. 3, the driving device 100 comprises typically a signal processing unit 200, a frequency adjustment unit 220, two modulating units 240, 250, two driver stages 260, 270, a velocity determining unit 120, a level normalizing unit 160 and an analog-to-digital converter 140. A reference unit 150 provides reference signals to the velocity determining unit 120, level normalizing unit 160 and the analog-to-digital converter 140.

The driving device 100 communicates with the external control unit 400 by the data node 105. The driving device receives commands related at least to the direction of movement or to stopping of the operation. The driving device 100 is synchronized to the external control unit 400 by a clock signal received by the node 106. There may be a further node 107 to receive an initialization signal, for example when powering up the device 500. The initialization command may also be received by the data node 105. Further, the driving device 100 may send, for example, position information to the control unit 400 by the node 105.

The driving device 100 comprises also a node 103 for receiving a position signal from the position sensor 70. The driving device 100 may further comprise a temperature sensor 72 and a temperature sensor interface unit 190 to convert a temperature signal received from the temperature sensor 72 to digital form.

The position sensor 70 may be implemented using an optical position sensor. The position sensor may comprise a photodiode or a light emitting diode, which in turn comprises a PN-junction. Said PN-junction is preferably also used as the temperature sensor. It is known that the junction voltage of a PN-junction depends on the temperature and may be used as a temperature signal. The temperature information may be used to compensate deviations of temperature-dependent parameter values in the device 500. For example, the signal provided by the position sensor 70 may depend on the temperature, and the temperature information may be used to take into account temperature dependent drift of the position signal. Also the driving frequency may be fine-tuned according to the temperature. The signal processing unit 200 may even determine a new optimum driving frequency Fopt, when a substantial change of temperature is detected.

The signal processing unit 200 adjusts the driving frequency of the piezo-elements 10, 20 by sending a signal to the frequency adjustment unit 220. The frequency adjustment unit 220 sends digitally synthetized voltage waveforms to the modulating units 240, 250. The modulating units 240, 250 modulate the digitally synthetized voltage waveforms at a high frequency, and the modulated signals are subsequently coupled to the driving stages 260, 270. The driving stages 260, 270 provide the driving voltages, which are coupled to the piezo-elements 10, 20 by inductive elements L.

The position signal provided by the position sensor 70 may depend on the operating temperature. The properties of the position sensor 70 exhibit manufacturing tolerances and may also drift with time. Therefore, the position signal is normalized by the level-normalizing unit 160 before conversion into digital form in the analog-to digital converter 140.

The velocity-determining unit 120 provides a rapid means to determine the velocity of an object 60 moved by the piezo-electric actuator 50. The velocity information is processed by the signal processing unit 100 to determine the optimum driving frequency Fopt.

Figure 4:
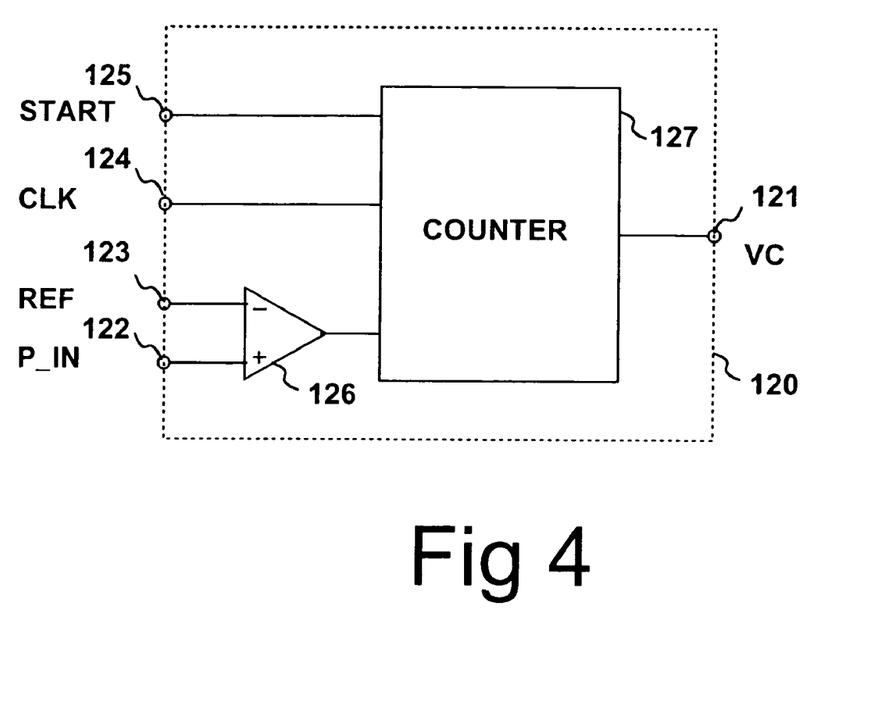
FIG. 4 shows the preferred embodiment of a velocity-determining unit.

Referring further to FIG. 4, the velocity determining unit 120 comprises typically a comparator 126 and a counter 127. The velocity determining unit 120 provides a velocity count VC, which is inversely proportional to the velocity Vel of the movable object 60.

The position signal provided by the position sensor 70 is coupled to the input 122 of the comparator 126. The comparator 126 compares the magnitude of the position signal with a reference level provided by the reference unit 150 to the input 123.

The determination of the velocity count VC comprises typically the following steps:
  the movable object 60 is first driven to an extreme position, which is associated with the lowest position signal,
  the signal processing unit 200 sends a command to move the movable object 60,
  the signal processing unit 200 sends a command to a first input 125 of the counter 127 to start the operation of the counter 127,
  the movable object 60 is moved, the position signal is increased, and simultaneously the counter 127 counts the number of pulses provided by a clock to a second input 124,
  the comparator 126 compares the position signal with the reference value and stops the counter when the position signal exceeds the reference value, and
  the velocity determining unit 120 provides the velocity count VC, which is sent to the signal processing unit 200.

The velocity count VC is proportional to the travelling time of the movable object between two predetermined positions. Thus, the velocity count VC is inversely proportional to the velocity of the movable object 60. In general, the velocity determining unit 120 is a device that provides a value, which depends on the rate of change of the position signal provided by the position sensor 70.

The signal processing unit 200 varies the driving frequency and at each frequency the velocity determining unit 120 is operated to determine the optimum driving frequency Fopt. Preferably, the optimum frequency Fopt, which provides the maximum velocity is selected using the recorded data, i.e. the frequency associated with the smallest velocity count CN is estimated to be the optimum driving frequency Fopt.

It should be understood, that there is a certain range within which the driving frequency may be considered to be optimal. This range can be visualised considering the width of the frequency peak in FIG. 2. Therefore, a frequency within said peak may be considered as optimal driving frequency Fopt even if not exactly coinciding with the absolute maximum value of said peak. A reason for not selecting said peak frequency may be, for example, desire to avoid acoustic resonance frequencies that would generate unnecessary high noise levels when operating the piezo-actuator or the driving device.

Figure 5:
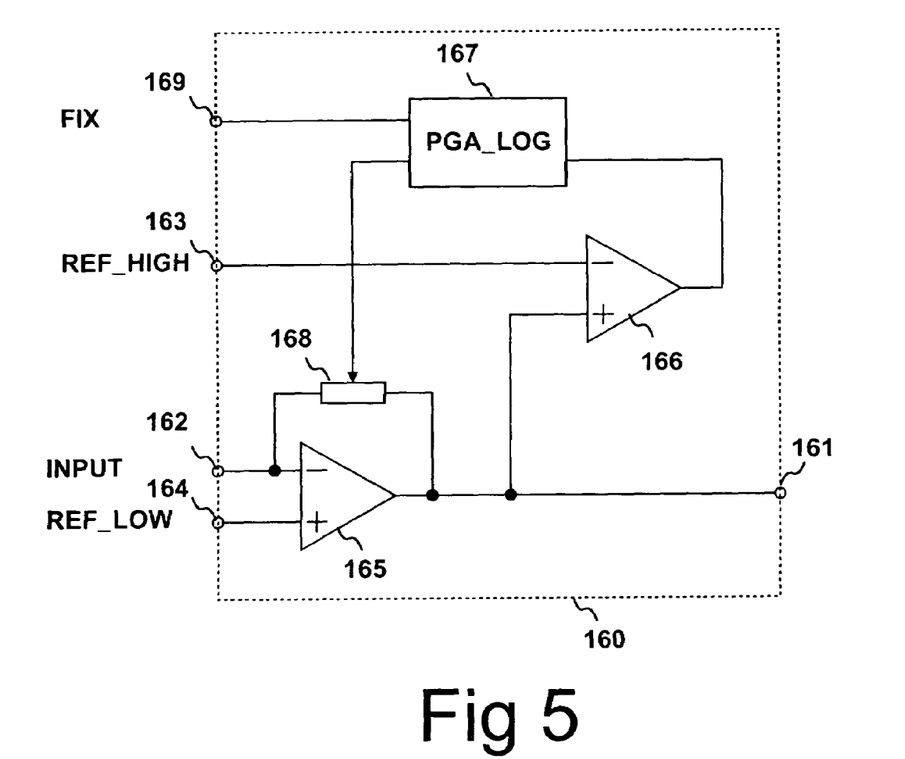
FIG. 5 shows the preferred embodiment of a signal level normalizing unit.

The position sensor 70 may provide an analog position signal, which is converted to digital form by the analog-to digital converter 140. It is ensured by the position signal normalizing unit 160 that the position signal does not exceed the allowable input range of the analog-to digital converter 140. Referring to FIG. 5, the position signal normalizing unit comprises a programmable gain amplifier 165 with an adjustable feedback resistor 168. In order to normalize the maximum value of the position signal provided by the position sensor 70, the movable object 60 is first moved to a position, which is associated with the highest signal. A resistor adjusting logic 167 is coupled to a comparator 166. The resistor adjusting logic 167 adjusts the value of the adjustable resistor 168 such that the analog signal at the output 161 is equal to the reference value provided at the input 163. After the adjustment, the value of the adjustable resistor is fixed, i.e. the amplification of the programmable gain amplifier 165 is fixed. The lowest signal level is recorded by driving the object 60 to the other extreme position. Preferably, the analog-to-digital converter 140 provides a 16-bit conversion to ensure sufficient resolution when the range of normalized input values covers only a part of allowable input range of the analog-to-digital converter 140.

After driving the movable object to both extreme physical positions, the signal processing unit 200 can associate the output signal of the analog-to-digital converter 140 with the real physical position of said movable object 60. Positions which are between the extreme positions are interpolated. Now, the analog-to-digital converter 140 provides position information, which is used to establish an average relationship between a change of the position of said movable object 60 and the respective number of driving voltage cycles required for the movement. Said relationship depends on the driving frequency.

Typically, the position cannot be determined accurately while the object 60 is moving. Therefore a change of position is preferably done in at least two steps. First, the piezo-electric actuator 50 is driven at a driving frequency during a time interval, which is selected to correspond to the number of driving voltage cycles required for the intended change of position. An intermediate position is measured after the first movement. The intermediate position is likely to deviate slightly from the intended final position, and therefore a further corrective movement may be required to reach the intended final position. The relationship between the change of the position of said movable object 60 and the respective number of driving voltage cycles may be refined based on the initial and the intermediate positions, and thus the intended final position is reached quite accurately after the corrective movement. All required actions, i.e. the determination of the initial position, first movement, the determination of the intermediate position, second movement, the determination of the final position, and the respective calculations are preferably performed in less than 4 milliseconds.

Figure 6:
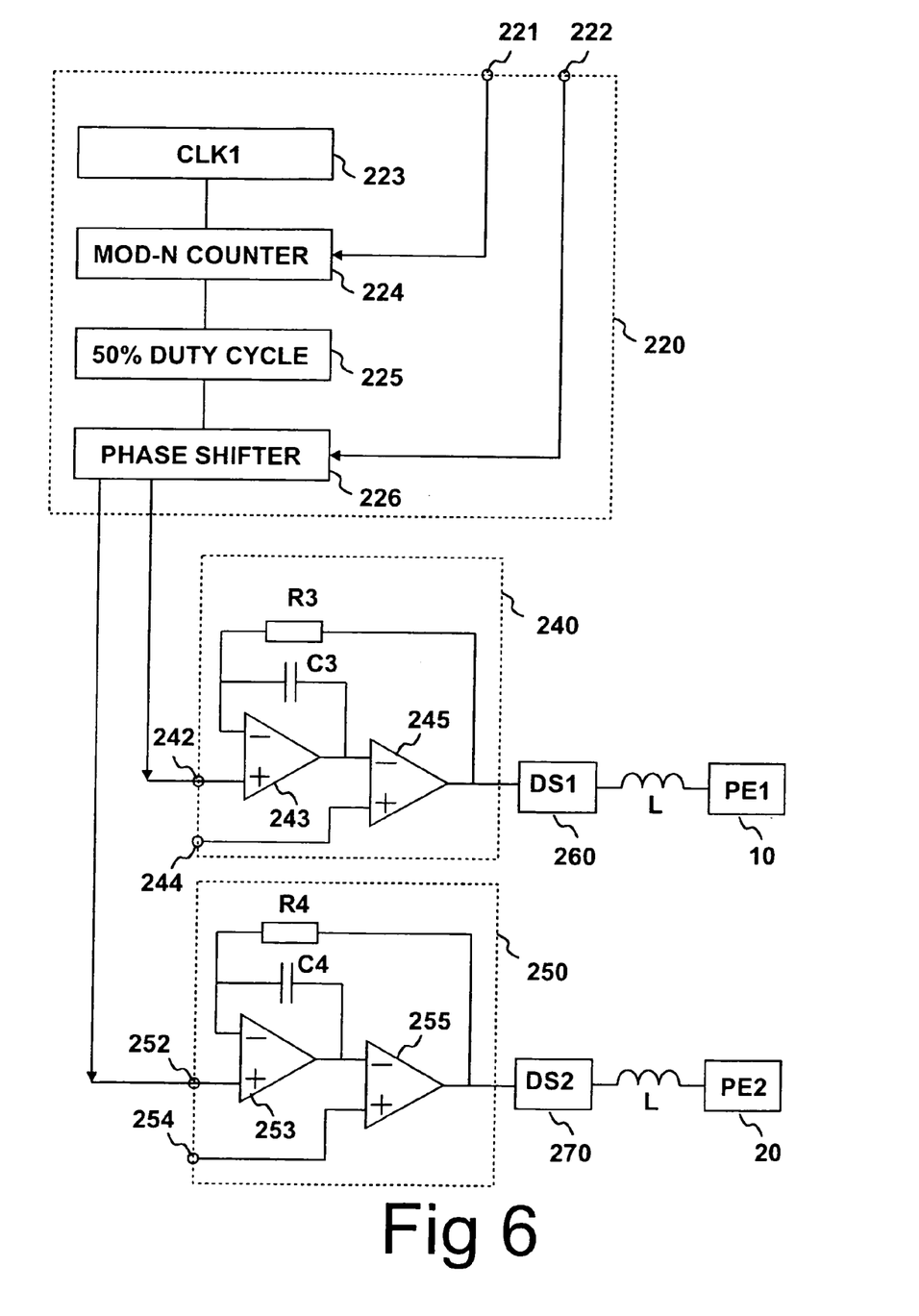
FIG. 6 shows the preferred embodiment of a frequency adjustment unit and two modulating units coupled to piezo-elements.

Referring to FIG. 6, the frequency adjustment unit 220 comprises a clock 223, a modulo-N-counter 224, a duty cycle regulator 225 and a phase shifter 226. The modulo-N-counter 224 divides the frequency of the clock 223 by an integer N. After each number N of clock pulses, the modulo-N-counter sends a short pulse to the duty cycle regulator 225. The duty cycle regulator provides a digital output signal having a 50% duty cycle, i.e. the output is in the high state for 50% of operating time and in the low state for 50% of operating time. The duty cycle regulator 225 comprises a digital flip-flop device with two inputs permanently coupled to the high value. The output of the modulo-N-counter 224 is coupled to the clock input of the flip-flop device. Each pulse short received from the modulo-N-counter 224 changes the output state of the flip-flop device. The duty cycle regulator 225 based on the flip-flop device divides the output frequency of the modulo-N-counter 224 by two.

The output of the duty cycle regulator 225 is coupled to the phase shifter 226. The phase shifter 226 generates two sinusoidal voltages, which have a mutual phase difference of substantially 90 degrees. Preferably, the phase shifter is a digital phase shifter. Typically, the digital phase shifter divides the output frequency of the duty cycle regulator 225 by two. The output of the digital phase shifter is filtered to provide a sinusoidal waveform. The phase shifter 226 may also be a RC phase shifter.

The output voltages of the phase shifter 226 are coupled to the inputs 242, 252 of the modulating units 240, 250. The modulating unit 240 comprises a sigma-delta converter implemented using the operational amplifier 243, comparator 245, feedback capacitor C3 and feedback resistor R3. The modulating unit 150 comprises respective components 253, 255, C4 and R4. A clock is coupled to clock inputs 244 and 254. The modulating units generate pulse-density modulated (PDM) output voltage waveforms, which correspond to the sinusoidal waveforms provided by the phase shifter 226, said modulated voltage waveforms being modulated at the frequency of the clock coupled to the clock inputs 244 and 254. The modulated signals are coupled to driving stages 260, 270, which in turn drive the piezo-elements 10, 20 by the inductive elements L. The frequency of the clock is selected to be substantially higher than the corner frequency of the coupled inductive element L and the piezo-element 10, 20. However, the frequency should not be selected too high, as a too high frequency is associated with increased energy losses in the driving stages 260, 270.

The sinusoidal waveforms may be modulated also to provide a pulse width modulated (PWM) signal. Driving of piezoceramics motors (piezo-electric actuators) with pulse width modulated sinusoidal waveforms is described for example in the article A. Richter, P. Rydlo, M. Kolar: Ultrasonic piezoceramics motor driven by PWM modulation with higher harmonic suppression, International Conference on Electrical Drives and Power Electronics (EPE 2003), the High Tatras, Slovak Republic, 24-26 September 2003, Proceedings, pp. 244-247.

Fourier analysis of the modulated driving voltage exhibits frequency components near at least two frequencies: the frequency of said sinusoidal waveform and the substantially higher frequency corresponding to the modulating clock frequency. Herein, the expression "a frequency of the driving voltage" is equivalent to the expression "a Fourier component of the Fourier transform of the driving voltage".

The driving frequency of the piezo-elements 10, 20 is adjusted by changing the value of the integer N of the modulo-N-counter 224 or by adjusting the frequency of the clock 223.

The direction of the movable object 60 is changed by reversing the sign of the phase difference generated by the phase shifter 226.

Figure 7:
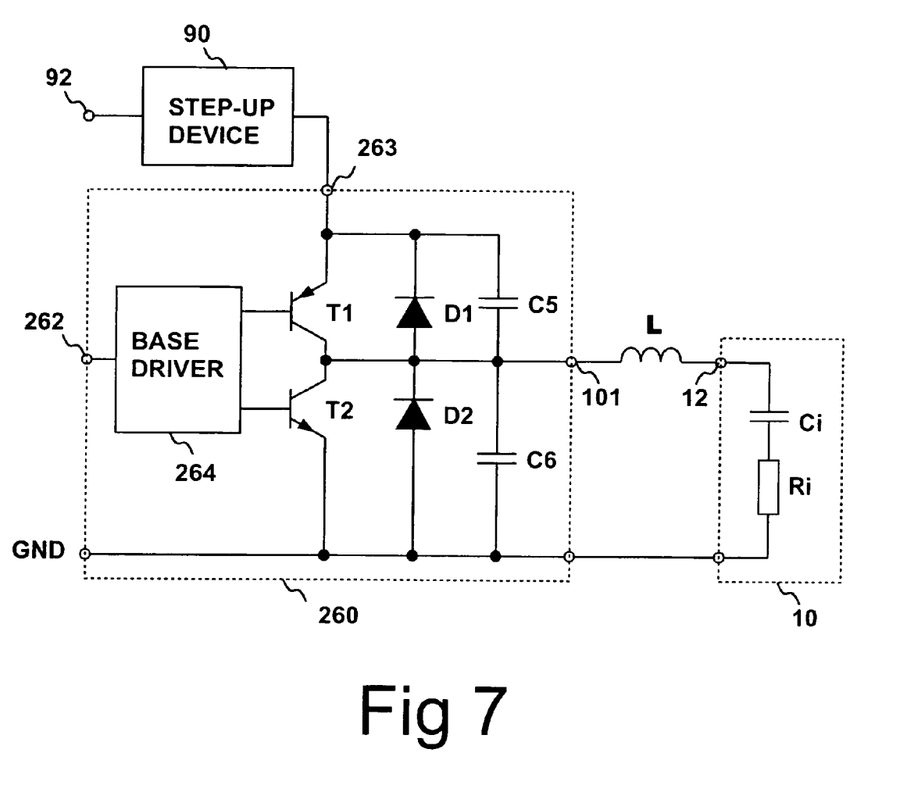
FIG. 7 shows a class DE driving stage coupled to a piezo-element.

Referring now to FIG. 7, the driving stage 260 comprises a class DE power amplifier implemented using two transistors T1, T2, two diodes D1, D2, two capacitors C5, C6 and a base driver circuit 264. The transistors T1, T2 connect the output 101 either to the ground GND or to the voltage provided by a voltage step-up device 90 activating the resonance circuit comprising the inductive element L, the internal capacitance Ci of the piezo-element 10 and the internal resistance Ri of the piezo-element 10. The output signal provided by the modulating unit 240 is coupled to the base driver 164, which in turn drives the bases of the transistors T1, T2.

The base driver circuit 264 is adapted to drive the transistors T1, T2 in such a way that there is a time interval during which none of the transistors is in the conducting state, in which case the driving stage 260 operates in class DE. The duty cycle of the transistors T1, T2 is substantially less than 50%.

Class DE amplifiers are described for example in the articles A. Alipov, V. Kozyrev: Push/Pull Class-DE Switching Power Amplifier, pp. 1635-1638, IEEE MTT-S Digest, year 2002; H. Koitzumi, T. Suetsugu, M. Fujii, K. Shinoda, S. Mori. K. Iked, Class DE High-Efficiency Tuned Power Amplifier, IEEE Transactions on Circuits and Systems-I: Fundamental Theory and Applications, Vol. 43, No. 1, January 1996; and M. K. Kazimierczuk, W. Szaraniec, Class D zero-voltage-switching inverter with only one shunt capacitor pp. 449-455, IEE Proceedings-B, Vol 139, No. 5, September 1992.

Preferably, the operating voltage for the driving stage 260 is provided by voltage step-up device 90, which increases voltage of the battery voltage coupled to the node 92. The voltage step-up device 90 may further comprise internal stabilizing capacitors (not shown) to suppress voltage fluctuations.

A further capacitor (not shown) may also be coupled in parallel with the piezo-element 10, i.e. between the node 12 and the ground GND in order to decrease the relative effect of the temperature dependence of the internal capacitance Ci.

The two transistors T1, T2 may also be adapted to connect and disconnect substantially simultaneously. In that case the driving stage 260 is said to operate in class D, and the duty cycle of the transistors T1, T2 is substantially equal to 50%. The two capacitors C5, and C6, as shown in FIG. 7, may be omitted in class D operation. Class D amplifiers generate typically a higher electromagnetic interference level than Class DE amplifiers.

Class D amplifiers are described for example in the articles V. M. Tousi, F. Sahandi, M. Atarodi, M. Shojaei, A 3.3V/1 W Class D Audio Power Amplifier with 103 dB DR and 90% Efficiency, pp. 581-584, Proc. 23rd international conference on microelectronics (MIEL2002), Vol. 2, NIS, Yugoslavia, 12-15 May 2002.

Referring back to FIG. 6, the implementation of the second driving stage 270 is preferably identical to the driving stage 260.

Referring to back to FIG. 1, the piezo-element driving device 100 may be used in a mobile device 500. The mobile device 500 may be for example a portable optical imaging system. In that case the mobile device 500 may comprise several piezo-element driving circuits 100 and piezo-actuators 50 to adjust the positions of several lens systems and optical components, in order to adjust the image magnification (zoom), the focus distance and the aperture of said portable optical imaging system. The signal processing unit 200 may be capable of performing autofocus algorithms in combination with the control unit 400, respectively. The mobile device 500 may further be a device with telecommunicating capabilities. It may be, for example, a mobile phone comprising a digital camera.

An embodiment of the present invention may also be used to drive a single piezo-element 10, 20, and consequently a piezo-actuator based on only one piezo-element 10, 20.

The device 100 according to the present invention may be implemented on an integrated circuit element, which is capable of driving several independent piezo-elements and/or piezo-actuators 50.

The possibility to adjust the driving frequency provides means to smoothly start and stop the movement of the movable object 60.

Referring back to FIG. 2. The electromechanical system comprising the piezo-actuator 50 and the coupling inductive element L may have more than one resonance frequencies. An algorithm applied to determine the optimum driving frequency comprises preferably sub-algorithms to distinguish several resonance frequencies and to select the optimum frequency associated with the optimum velocity.

When determining the optimum driving frequency Fopt, the driving frequency may also be varied in a sweeping fashion, and using a plurality of velocity determining units 120 to determine several velocity counts corresponding to several position intervals of the movable object 60. Thus, the optimum Fopt may be determined faster than by tuning the driving frequency in a stepwise fashion.

Mathematical maximizing algorithms may be applied to increase the speed of determination and/or to decrease the number of data points required for the identification of the optimum driving frequency Fopt.

The operating piezo-actuator 50 generates audible noise. A further criterion for selecting the optimum driving frequency Fopt may be noise reduction. The frequency may be adjusted to avoid disturbing audible sounds, if necessary. A noise reduction of 6 dB can be clearly noticed by human ears. Especially in mobile devices, such as cameras or camera phones, the noise issue is very important because the piezo-actuators may be used in situations where unnecessary noise should be avoided. Such situations might include, for example, photographing when someone is giving an important speech. Also the nature of the noise, not alone the volume in decibels, has quite strong effect on how disturbing the noise is experienced by people.

Instead of using the velocity-determining unit 120, the signal processing unit 200 may also determine the velocity of the object 60 on the basis of the position digital signal provided by the analog-to-digital converter 140. However, typically, the velocity-determining unit 120 provides a much faster means to determine the velocity than the determination on the basis of the digital position signal.

For the person skilled in the art, it will be clear that modifications and variations of the device and method according to the present invention are perceivable. The particular embodiments described above with reference to the accompanying drawings are illustrative only and not meant to limit the scope of the invention, which is defined by the appended claims.

What is claimed is:

1. An apparatus comprising:
a first output to drive a piezo-element,
a driving unit configured to provide a driving voltage to said first output,
an input configured to receive a position signal,
a first signal processing unit configured to determine one or more values, each of said one or more values being dependent on a rate of chance of said position signal,
a second signal processing unit configured to determine an optimum driving frequency based on said one or more values such that a noise level generated by said piezo-element when driven at said optimum driving frequency is reduced when compared with a noise level associated with a maximum obtainable velocity of said movable object, and
an adjustment unit configured to adjust the driving frequency of said driving voltage to be substantially equal to said optimum driving frequency,
wherein said apparatus further comprises a temperature sensor interface unit configured to receive a temperature signal, and wherein the adjustment unit is further configured to tune said driving frequency based on said temperature signal.

2. An apparatus comprising:
a first output to drive a piezo-element,
a driving unit configured to provide a driving voltage to said first output,
an input configured to receive a position signal,
a first signal processing unit configured to determine one or more values, each of said one or more values being dependent on a rate of change of said position signal,
a second signal processing unit configured to determine an optimum driving frequency based on said one or more values such that a noise level generated by said piezo-element when driven at said optimum driving frequency is reduced when compared with a noise level associated with a maximum obtainable velocity of said movable object, and
an adjustment unit configured to adjust the driving frequency of said driving voltage to be substantially equal to said optimum driving frequency, further comprising:
a temperature sensor interface unit configured to receive a temperature signal, wherein
the first signal processing unit is configured to establish a relationship between said position signal and the position of said movable object, and wherein the adjustment unit is configured to correct said relationship based on said temperature signal.

3. The apparatus according to claim 1, wherein said apparatus, wherein the temperature sensor interface unit is configured to receive a temperature signal initially generated by a PN-junction.

4. An apparatus comprising:
a movable object,
a piezo-element configured to move said movable object,
a piezo-element driving unit configured to provide a driving voltage to said piezo-element, and
a position sensor configured to provide a position signal dependent on the position of said movable object,
said piezo-element driving unit in turn comprising:
a first signal processing unit configured to determine one or more velocity values, each of said one or more velocity values being dependent on a velocity of said movable object,
a second signal processing unit configured to determine an optimum driving frequency based on said one or more velocity values such that a noise level generated by said piezo-element when driven at said optimum driving frequency is reduced when compared with a noise level associated with a maximum obtainable velocity of said movable object, and
an adjustment unit configured to adjust the driving frequency of said driving voltage to be substantially equal to said optimum driving frequency,
wherein said apparatus further comprises a temperature sensor interface unit configured to receive a temperature signal, and wherein the adjustment unit is further configured to tune said driving frequency based on said temperature signal.

5. An apparatus comprising:
a movable object,
a piezo-element configured to move said movable object,
a piezo-element driving unit configured to provide a driving voltage to said piezo-element, and
a position sensor configured to provide a position signal dependent on the position of said movable object,
said piezo-element driving unit in turn comprising:
a first signal processing unit configured to determine one or more velocity values, each of said one or more velocity values being dependent on a velocity of said movable object,
a second signal processing unit configured to determine an optimum driving frequency based on said one or more velocity values such that a noise level generated by said piezo-element when driven at said optimum driving frequency is reduced when compared with a noise level associated with a maximum obtainable velocity of said movable object, and
an adjustment unit configured to adjust the driving frequency of said driving voltage to be substantially equal to said optimum driving frequency, further comprising:
a temperature sensor interface unit to receive a temperature signal and, wherein the first signal processing unit is configured to establish a relationship between a position signal and the position of said movable object, and wherein the adjustment unit is configured to correct said relationship based on said temperature signal.

6. The apparatus according to claim 4, wherein said apparatus further comprises a PN-junction to initially generate said temperature signal.

7. An apparatus comprising:
  means for driving a piezo-element,
  means for providing a driving voltage to said means for driving,
  means for receiving a position signal,
  means for determining one or more values, each of said one or more values being dependent on a rate of change of said position signal,
  means for determining an optimum driving frequency based on said one or more values such that a noise level generated by said piezo-element when driven at said optimum driving frequency is reduced when compared with a noise level associated with a maximum obtainable velocity of said movable object, and
  means for adjusting the driving frequency of said driving voltage to be substantially equal to said optimum driving frequency.

8. The apparatus according to claim 7, wherein said apparatus further comprises means for receiving a temperature signal, and means for tuning said driving frequency based on said temperature signal.

* * * * *